April 1, 1958 G. A. SWARTZ ET AL 2,828,590
METHOD OF AND MACHINE FOR MAKING PACKAGES CONTAINING
SOLID ARTICLES AND A FLUENT SUBSTANCE
Filed May 13, 1954 4 Sheets-Sheet 2
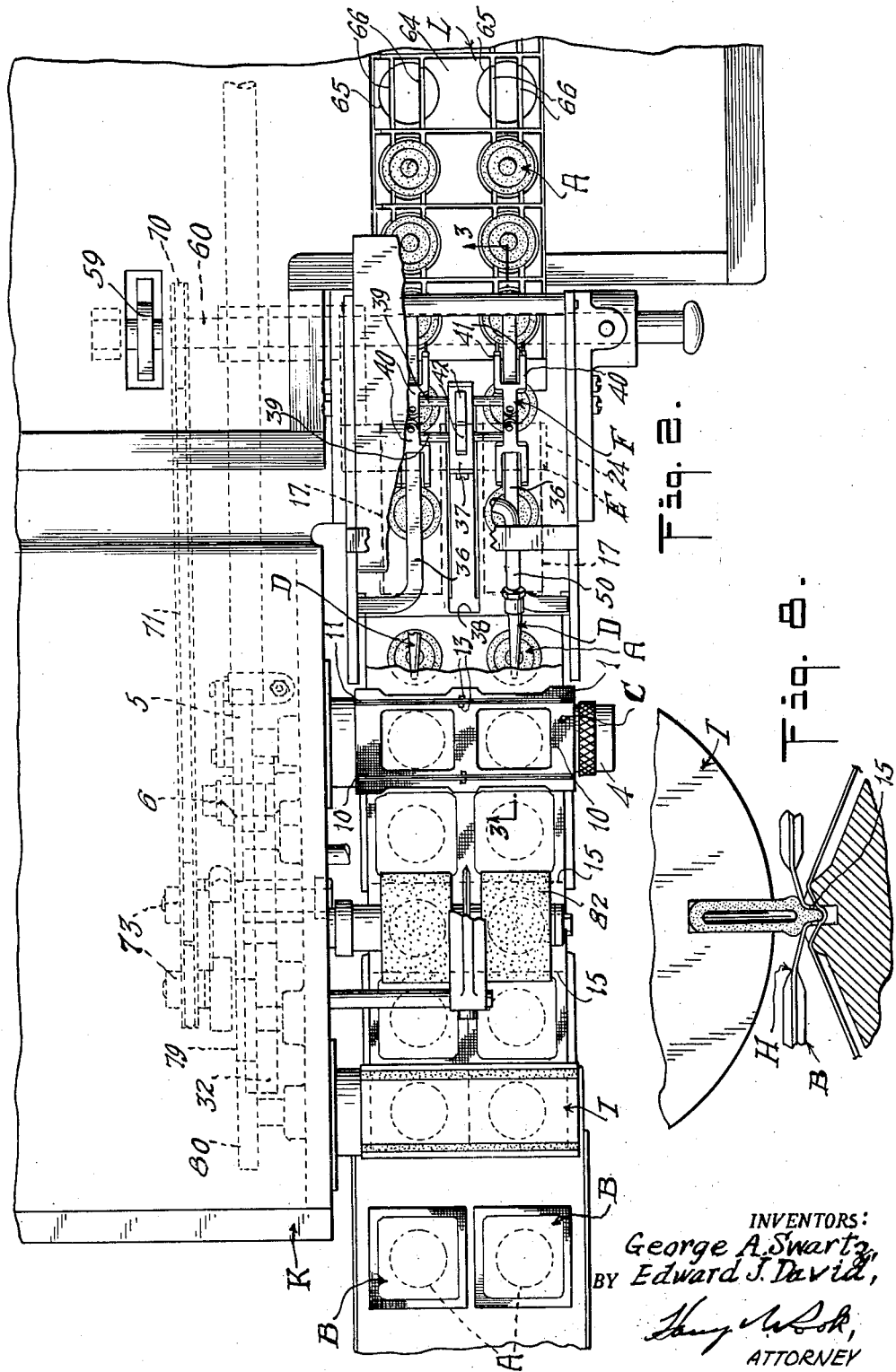
INVENTORS:
George A. Swartz,
BY Edward J. David,
ATTORNEY

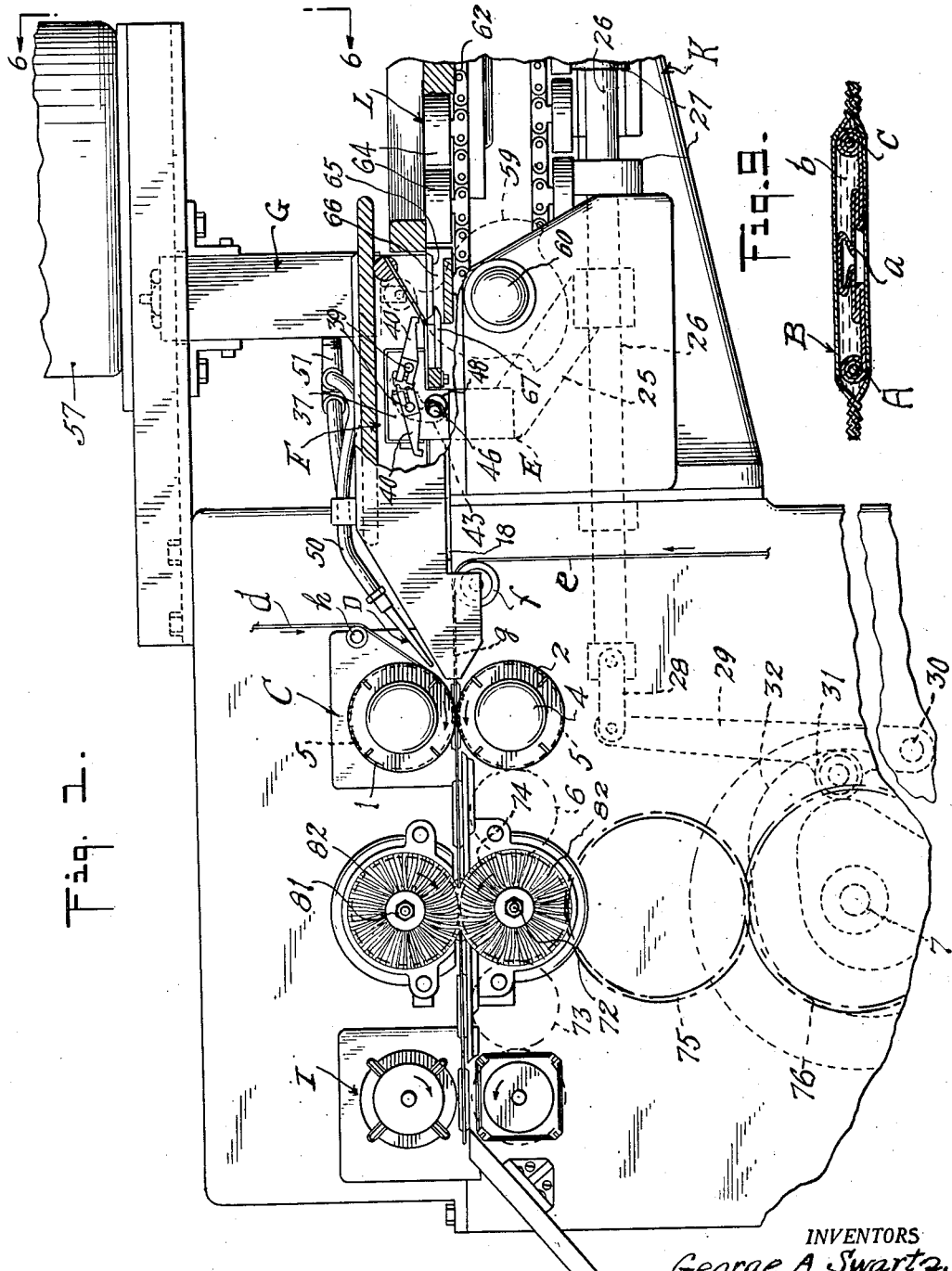

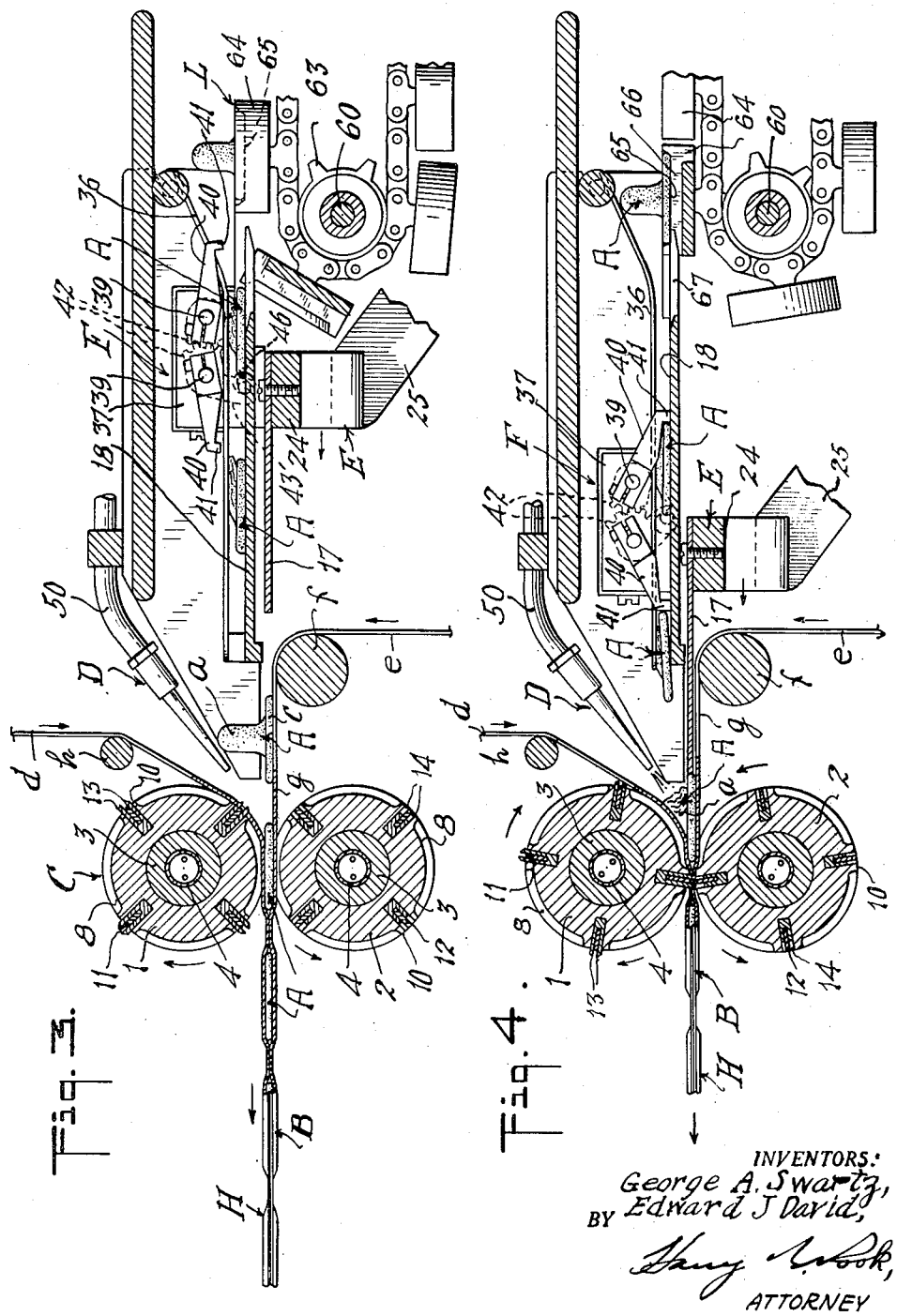

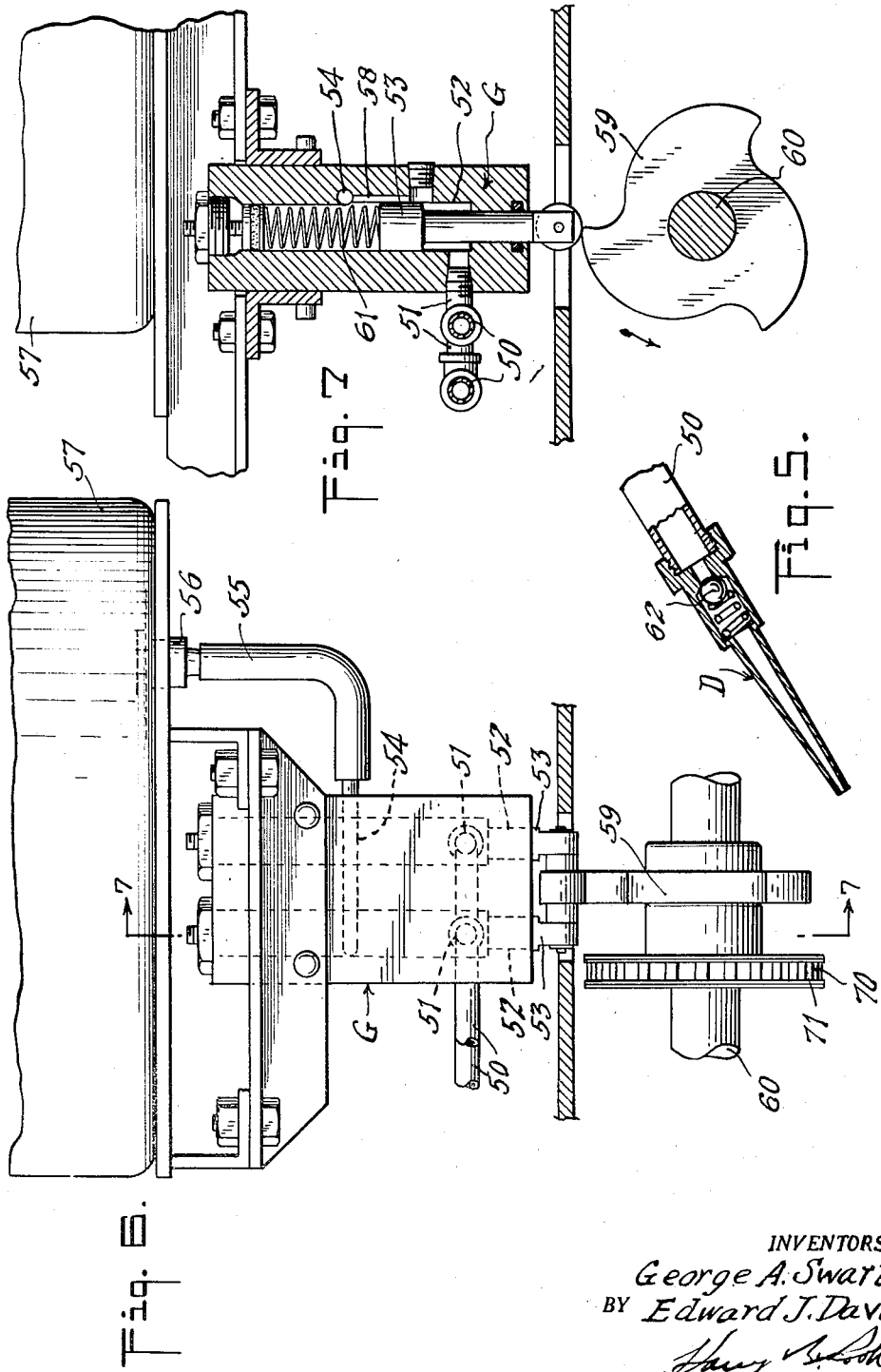

UNITED STATES PATENT OFFICE

2,828,590

**METHOD OF AND MACHINE FOR MAKING PACK-
AGES CONTAINING SOLID ARTICLES AND A
FLUENT SUBSTANCE**

George A. Swartz, Millington, and Edward J. David,
Hillside, N. J., assignors to Ivers-Lee Company, New-
ark, N. J., a corporation of Delaware Application May 13, 1954, Serial No. 429,510

2 Claims. (Cl. 53—28)

This invention relates in general to a method of and machine for packaging solid articles in a fluent substance, such as liquid, oil or grease; and more particularly, the invention contemplates a package of the type that comprises two opposed layers of packaging material heat-sealed together in zones forming and bounding a commodity-containing compartment between the layers.

A prime object of the invention is to provide a method and machine of the character described whereby a fluent substance, such as a liquid may be enclosed in a novel and improved manner within the commodity-containing compartment in surrounding relation to the article or commodity in the compartment.

The invention especially contemplates the packaging of articles that have portions of greater dimensions than the distance between said layers in the commodity-containing compartment, which portions are deformable so that they may be compressed or contracted to such dimensions that they may be enclosed between the layers of packaging material without damage to the article or to the package; and another object of the invention is to provide a method and machine whereby said deformable portions of the articles can be compressed automatically immediately prior to the enclosure of the articles between the layers of packaging material.

Other objects, advantages and results of the invention will be brought out by the following description in conjunction with the accompanying drawings in which Figure 1 is a fragmentary side elevational view of a portion of the machine embodying the invention;

Figure 2 is a top plan view of the portion of the machine shown in Figure 1;

Figure 3 is an enlarged longitudinal vertical sectional view approximately on the plane of the line 3—3 of Figure 2, showing the parts in normal position;

Figure 4 is a similar view showing the parts in the position assumed during the insertion of an article between the layers of packaging material;

Figure 5 is an enlarged fragmentary vertical longitudinal sectional view through one of the liquid-injecting nozzles;

Figure 6 is an enlarged end elevational view of the liquid-supplying tank and liquid-injecting pump;

Figure 7 is a vertical sectional view approximately on the plane of the line 7—7 of Figure 6;

Figure 8 is an enlarged fragmentary transverse vertical sectional view through portions of the rollers for severing the package strip; and Figure 9 is an enlarged vertical sectional view through one of the completed packages.

For the purpose of illustrating the principles of the invention, we have shown it embodied in a machine for enclosing a circular ring-like article A of soft rubber between two layers of packaging material to form a flat package B having a compartment between the layers in which the article is contained with a fluent substance $b$, such as a lubricant in liquid or semi-liquid form. As shown, the article has a deformable portion $a$ that normally projects out of the ring-like main portion a distance several times greater than the distance between the layers of packaging material in the completed package, and in accordance with the invention this deformable portion is automatically pressed or deformed to a dimension approximately equal to the space between the layers of packaging material in the commodity-containing compartment. More particularly, the portion $a$ is hollow and the ring portion $c$ is concave at the side from which portion $a$ projects. Also the portion $a$ projects centrally from the ring-like portion $c$ and is of a height substantially greater than the radius of the ring of the ring-like portion, and it is desirable that the portion $a$ be compressed wholly within the ring-like portion $c$ to avoid jamming of the portion $a$ between the ring-like portion and the packaging layer. The method and machine of the invention accomplishes all of these results.

For the purpose of illustrating the invention, we have shown it in connection with a machine of the same general nature as that described in Patent No. 2,443,327 date June 15, 1948. In general the machine of the invention includes means C for securing together two layers $d$ and $e$ of packaging material such as metal foil, paper, "Cellophane" and "Pliofilm" or the like to form a compartment between them in which the articles A are enclosed. The articles are inserted between the layers of packaging material by a pushing mechanism E to which the articles are fed in succession by a feeding mechanism F to which the articles are supplied by a supply conveyor L. Approximately simultaneously with the insertion of the articles between the packaging layers, a fluent substance, such as a liquid lubricant, is injected into the commodity-containing compartment of the package through an injecting nozzle D by a pump G.

As the articles are enclosed between the packaging materials, a package strip H is formed having a plurality of longitudinally spaced article-containing compartments, and this strip is severed into individual packages or groups of packages by a mechanism I that is identical with that shown in said patent.

The strips $d$ and $e$ of packaging material are feed from any source such as supply rolls that may be mounted in any suitable manner, and the strips are drawn from the supply by the package forming mechanism C. This mechanism includes two rollers 1 and 2 which are mounted to rotate about parallel axes on tubular shafts 3 in each of which preferably is arranged an electric heater 4 of known construction for applying heat to the rollers to facilitate securing the strips of packaging material together where the latter are thermoplastic or have thermoplastic coating. These rollers are driven in opposite directions through intermeshing pinions 5 each of which is connected to one of the shafts 1 and 2 and one of which is driven by an idler gear 6 through gearing which will be hereinafter described from a drive shaft 7 which is connected to any suitable source of power.

As shown, the lowermost layer $e$ passes upwardly over an idler roller $f$ and has a portion $g$ approximately horizontally disposed between said idler roller and the upper portion of the lower sealing roller 2 in approximately tangential relation to said rollers $f$ and 2 (see Figure 3). The upper packaging layer $d$ is drawn downwardly around an idler roller $h$ and beneath the upper sealing roller 1.

As shown, the rollers 1 and 2 are formed to make simultaneously two packages, each roller having two series of circumferentially spaced recesses 8 each of which is adapted to coincide with or move in juxtaposition to one of the recesses of the other roller during rotation of the rollers. These recesses are shaped to correspond approximately to the shape of the desired package and the coincident recesses of the two rollers form a clearance between them for the article as it is enclosed in a compartment between the packaging strips. The recesses 8 of each series are arranged in alignment with each other longitudinally of the rollers as clearly shown in Figure 1. Each of the recesses is surrounded on the periphery of the corresponding roller with sealing surfaces 10 which preferably are corrugated or crimped for the purpose of sealing the package strips together in enclosing relation to the articles.

Between the recesses 8 on the roller 1 are knife blades 11 whose beveled edges are adapted to cooperate with straight flat surfaces on corresponding platens 12 on the other roller 2 for scoring the packaging strips in zones or lines 15 between the article containing compartments to facilitate severing of the strips. Also, the roller 1 may have a prong 13 at each side of each knife blade 11 projecting from the roller to enter corresponding notches 14 in the roller 2 to form perforations in the package strips adjacent the scored lines to facilitate tearing open of the individual packages.

One of the articles A is inserted between the packaging strips as each recess of one roller approaches the corresponding recess of the other roller, and the packaging strips are first sealed together by the sealing surfaces 10 along a zone at the leading edges of the recesses and are progressively sealed together in zones bounding the article to form a compartment between the layers in which the article is enclosed. As each compartment is completed the knife blade 11 and platen 12 form a scored line or a line of perforations 15 in a zone in the packaging strip between said compartment and the compartment next to be formed as shown in Figures 3 and 4.

The means E for inserting the articles between the packaging strips includes a pusher 17 for each series of recesses 8. The pusher cooperates with the chute 18 one end of which is disposed approximately above the idler roller $f$ and the horizontal portion $g$ of the packaging layer $e$, and the articles A are dropped by gravity in succession from the end of the chute onto said horizontal portion $g$ of the packaging layer. As shown, the pushers 17 are mounted on a horizontal actuating bar 24 which has a downwardly extending arm 25 which is connected to a push rod 26 slidably mounted in bearings 27 in the frame K of the machine and having one end connected by a link 28 to one end of a lever 29, the other end of which is pivotally connected at 30 to the machine frame. The lever has a follower 31 which engages a box cam 32 which in turn is mounted on the drive shaft 7. With this construction, the pushers 17 are reciprocated forwardly from the normal position show in Figure 3 to the article-inserting position of Figure 4 and then backwardly to the normal position.

It will be observed that the pushers 17 are disposed in horizontal planes slightly above the horizontal portion $g$ of the packaging layer $e$ and that the articles A are dropped onto the pushers 17 when the pushers are in their forward position (Fig. 4), and upon return movement of the pushers the articles are slide off the pushers onto said horizontal portion $g$ of the packaging layer in the path of movement of the pushers so that as the pushers next move forwardly from the normal position of Figure 3, they will engage and push before them the articles on the horizontal portions $g$ into the spaces between the packaging layers in juxtaposed position to the recesses 8 of the sealing rollers. Simultaneously the rollers 1 and 2 are rotated so as to seal the layers together along the boundaries of the recesses 8, thereby starting the formation of the article-containing compartments, as shown in Figure 4.

At about the same time that the rollers 1 and 2 begin to seal the layers of packaging material around the articles, the upstanding deformable portions $a$ of the articles are compressed or deformed into the ring-like portions, and in accordance with the invention, this operation is performed by the same means by which the fluent substance is injected into the package.

As shown, the injecting nozzle D for each series of recesses 8 is mounted on the end of a pipe 50 above the horizontal portion $g$ of the packaging layer $e$ with its outlet end adjacent the nip of the sealing rollers 1 and 2 as best shown in Figures 3 and 4. The other end of each pipe 50 is connected to the outlet 51 of a pump that includes a cylinder 52 in which is reciprocable a piston 53. Above the piston the cylinder 52 is provided with an inlet passage 54 which is connected by a tube 55 to the outlet 56 of a tank 57 for the fluent substance to be injected into the packages. Leading downwardly from the inlet passage 54 is an inlet groove 58 in the inner wall of the cylinder. The piston is actuated in one direction by a cam 59 that is mounted on a shaft 60 which also drives the feed conveyor L and is driven in timed relation to the sealing rollers 1 by a mechanism identical with that shown in Patent No. 2,443,327 and which will be hereinafter briefly described. The piston is operated in the other direction and is caused to follow the cam 59 by a compression spring 61. Preferably the nozzle D has a spring-closed check valve 62 as best shown in Figure 5.

In operation of the liquid-injecting apparatus, as the article A starts its movement between the sealing rollers 1, the cam 59 permits the piston 53 to be snapped downwardly by the spring 61 so as to force from the cylinder a predetermined quantity of the fluent substance and to project a jet of said substance from each nozzle D against the upstanding portion $a$ of the article A to compress said portion $a$ into the ring-like portion $c$ and at the same time deposit said quantity of fluent substance into the package compartment. With the nozzle disposed obliquely to the horizontal portion $g$ of the layer B with its outlet in juxtaposition to and directed toward the nip of the rollers 1 and 2, as shown, the force of the jet of fluent substance effectively presses the flexible and compressible portion $a$ of the article downwardly and into the ring-like article and toward the partially formed compartment, and escape of the fluent substance from the partially formed compartment is restrained by the partially formed walls of the compartment. Continued rotation of the rollers 1 in the directions of the arrows in Figure 4 causes the upper packaging layer $d$ to be pressed downwardly and sealed to the lower layer $e$ around the article A so that the article with said fluent substance is enclosed within the package compartment as clearly shown in Figure 9. The jet of fluent substance ensures that the upstanding portion $a$ of the article shall be compressed within the ring-like portion so as to avoid the possibility of said portion $a$ overlapping the ring-like portion and becoming jammed between the ring-like portion and the layer of packaging material.

It will be understood, of course, that if it were not desirable to inject liquid into the package, air could be projected from the nozzles D to compress the deformable portions $a$ of the articles.

The articles to be packaged are fed to the horizontal portion $g$ of the lower layer of packaging material by the feeding mechanism F which includes the chute or table 18 mounted on the frame K of the machine. Reciprocable longitudinally of the table or chute is a feeding element for pushing articles over the end of the table or chute onto the pushers 17, and including a bracket 37 which extends through a slot 38 in the table or chute 18 and is rigidly mounted on the actuating bar 24 and has journaled therein two horizontal shafts 39 at each end of each of which is a feeding arm 40, the two arms at the corresponding ends of the shafts serving the corresponding rows of articles. Each arm has a pair of fingers 41 for engaging the articles on the table, and there is thus a pair of arms for each of the rows of articles. The arms of each pair are oscillatable simultaneously toward and away from the table so that when the feeding element is moved in one direction, in the present instance to the right in Figures 3 and 4, the arms 40 will be swung away from the table so as to move over and clear of the articles as shown in Figure 3, while upon movement of the feeding element in the other direction the arms 40 will be oscillatable toward the table so that one thereof will engage and pull one article from the supply mechanism L, while the other arm will engage and push the next preceding article from the chute or table onto the horizontal portion g of the layer of packaging material as shown in Figure 4. Preferably bars 36 are provided for deflecting the upstanding portions a of the articles to positions below the shafts 39.

The means for oscillating the arms is shown as comprising a gear segment 42 on each shaft 39 meshing with the segment on the other shaft and a depending arm 43 connected to one of the segments which extends into the slot 38 and has a friction element mounted therein and held in engagement with the side walls of the slot 38 by a suitable spring (not shown). All of this structure may be identical with that shown in the above mentioned Patent No. 2,443,327. The bracket 37 has openings 48 through which the shoe 46 freely projects, the walls of said openings serving as stoppers to limit swinging movement of the arm 43. With this construction, upon the beginning of longitudinal movement of the bracket 37 the shoe 46 frictionally drags on the walls of the slot 38 so as to oscillate the arm 43 and consequently actuate the feeding arms 40, whereupon continued movement of the bracket in the same direction will overcome said friction and cause movement of the bracket longitudinally of the table or chute.

All of this feeding mechanism is identical with that shown in the above mentioned Patent No. 2,443,327. The supply mechanism L is also substantially the same as that shown in said patent and comprises a pair of chains 62 mounted on sprockets 63 that are carried by the shafts 60. Conveying elements 64 are mounted on said chains and each has two recesses 65 each to receive an article A. The chains are actuated to move the conveying elements successively into juxtaposed position to and under the feeding table 18, and the conveying elements have transverse grooves 66 extending inwardly from their edges across the corresponding recesses, while the table has a finger 67 in line with each of said grooves so that as each conveying element is moved toward the feeding table each of the fingers 67 will enter the corresponding groove 66 beneath the article in said conveying element as shown in Figure 4 so as to cause sliding of the article onto the table into the position shown in Figure 3 ready to be engaged by the corresponding feed arm 40.

As above stated, the driving mechanism may be identical with that described in said Patent No. 2,443,327. The shaft 60 has a sprocket 70 which is connected by a chain 71 to a shaft 72 around idler sprockets 73. The shaft 72 has a pinion 74 that meshes with an idler gear 75 that in turn meshes with pinion 76 on the drive shaft 7. An idler pinion 6 connects the pinion on the shaft 72 with a pinion 5 on the shaft of the lower sealing roller 2. Similarly an idler pinion 79 connects the pinion on the shaft 72 with a pinion 80 on the lower shaft of the mechanism I for separating the package strip into individual packages or groups of packages. The shaft 72 is geared to a shaft 81 above it and said shafts have cooperating brushes 82 to hold the package strip against buckling as it is cut by the knives 11, 12 and also to maintain the package strip under tension as it moves to the rollers of the severing mechanism I.

While we have shown and described the invention as embodied in a certain type of machine and in certain specific details of construction, it will be understood that many modifications and changes may be made in the construction of the machine and the invention may be embodied in machines of different types within the spirit and scope of the invention. In the appended claims the term "fluent substance" is intended to include gas, such as air, liquid, grease and paste.

What we claim is:

1. The method of packaging a ring-like portion and an article having a flexible and compressible portion projecting upwardly from within said ring-like portion, said method comprising longitudinally moving two opposed flat layers of flexible packaging material and during said movement progressively sealing said layers together in a zone to partially form an article-receiving compartment between them, arranging said layers with a portion of the first layer adjacent said zone approximately horizontal and with a portion of the second layer above and in spaced relation to said horizontal portion of the first layer, depositing an article on said horizontal portion and sliding the article along said horizontal portion and between and into contact with said layers adjacent said zone, and projecting under pressure a predetermined quantity of a fluent substance into said partially formed compartment and against said flexible and compressible portion thereby compressing said flexible and compressible portion into said ring-like portion and said partially formed compartment and between said layers so as to prevent pinching of said flexible portion between said ring-like portion and said packaging layers, and at the same time continuing said longitudinal movement and said progressive sealing of said layers and thereby completing said compartment with said article enclosed therein.

2. A machine for packaging articles each of which has a ring-like portion, comprising means for continuously feeding flexible layers of packaging material longitudinally and in opposed relation including a pair of sealing rollers rotatably mounted about approximately parallel axes and having peripheral sealing surfaces to receive and press said layers of packaging material between them, at least one of said rollers having recesses surrounding said sealing surfaces such that the recesses and the sealing surfaces of said roller cooperate with the sealing surfaces of the other roller to seal said layers, means guiding said layers with a portion of the first layer adjacent said zone approximately horizontal, and with a portion of the second layer above and in spaced relation to said horizontal portion of the first layer, means for depositing an article on said horizontal portion of said first layer, means for sliding each article with its ring-like portion horizontally disposed along said horizontal portion and between and into contact with said layers adjacent said zone, a reservoir for a fluent substance to be deposited in said ring-like portion of each article, a nozzle connected to said reservoir and disposed obliquely to said horizontal portion with its outlet in juxtaposition to and directed toward the nip of said rollers above said horizontal portion of said one layer, and means operating in timed relation to the rotation of said sealing rollers and to said means for sliding each article along the horizontal portion of said one layer for successively ejecting predetermined quantities of said fluent substance from said reservoir under pressure through said nozzle outlet whereby a jet of said fluent substance is forcibly projected into said ring-like portion of each article in the direction of said partially completed compartment.

References Cited in the file of this patent

UNITED STATES PATENTS

| 2,083,618 | Salfisberg | June 15, 1937 |
| 2,166,643 | Salfisberg | July 18, 1939 |
| 2,180,966 | Salfisberg | Nov. 21, 1939 |
| 2,443,327 | Salfisberg | June 15, 1948 |
| 2,608,809 | Stroop | Sept. 2, 1952 |
| 2,663,129 | Dowofrio | Dec. 23, 1953 |